United States Patent [19]

Uemura et al.

[11] Patent Number: 4,777,822
[45] Date of Patent: Oct. 18, 1988

[54] METHOD OF HOT ROLLING COPPER

[75] Inventors: Ikuji Uemura; Fumio Ono, both of Yokohama; Eiji Kamijo, Hyogo; Tatsuya Nishimoto, Hyogo; Matsuo Higuchi, Hyogo, all of Japan

[73] Assignee: Sumitomo Electric Industries, Ltd., Osaka, Japan

[21] Appl. No.: 127,592

[22] Filed: Dec. 3, 1987

Related U.S. Application Data

[60] Continuation of Ser. No. 822,227, Jan. 24, 1986, abandoned, which is a continuation-in-part of Ser. No. 655,297, Sep. 26, 1984, abandoned, which is a division of Ser. No. 404,893, Aug. 3, 1982, abandoned.

[51] Int. Cl.$^4$ .............................................. B21B 27/00
[52] U.S. Cl. ........................................ 72/366; 72/462; 29/132; 501/97
[58] Field of Search ............. 72/366, 462, 467; 29/132, 13; 419/23; 501/97

[56] References Cited

U.S. PATENT DOCUMENTS 4,264,547  4/1981  de Pous .................................. 501/97
4,412,009  10/1983  Komatsu et al. ...................... 501/97

FOREIGN PATENT DOCUMENTS 2536354  3/1976  Fed. Rep. of Germany ........ 29/132
112135   8/1980  Japan ..................................... 72/467
109519   7/1982  Japan ..................................... 72/467

*Primary Examiner*—Lowell A. Larson
*Attorney, Agent, or Firm*—Wenderoth, Lind & Ponack

[57] ABSTRACT

The present invention relates to a method of hot rolling copper or copper alloys such as copper wires and coppr plates. The present invention has succeeded in remarkably prolonging useful life of the tools used for hot rolling, and improving the surface quality of the rolled products by replacing the conventional methods of hot rolling copper using tools made of cemented carbide, die steel, high-speed steel, etc. by a method using tolls made essentially of $Si_3N_4$. $Si_3N_4$ tools used in the present invention contain at least one kind of sintering aid selected from the group consisting of $Al_2O_3$, AlN, MgO, $Y_2O_3$ and $ZrO_2$, have a sintering density of 90% or more, Rockwell hardness of 88 or more and an average particle diameter of $2\mu$ or less, and contain $\beta$-type $Si_3N_4$ as a main ingredient.

2 Claims, 1 Drawing Sheet

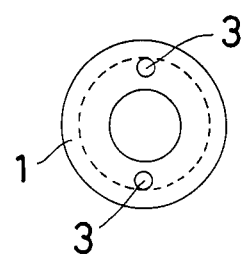
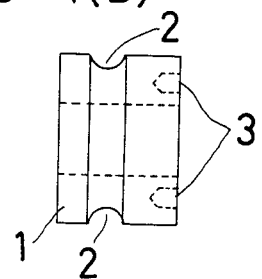
FIG 1(A)  FIG 1(B)
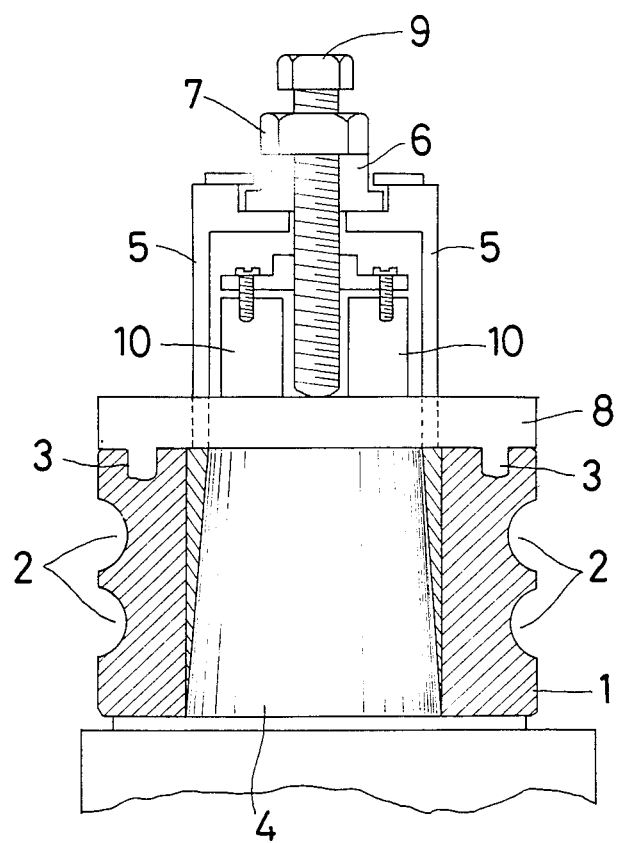
FIG 2

METHOD OF HOT ROLLING COPPER

This application is a continuation of Ser. No. 822,227 filed Jan. 24, 1986, now abandoned, which is a continuation-in-part of Ser. No. 655,297 filed Sept. 26, 1984, now abandoned, which is a division of Ser. No. 404,893 filed Aug. 3, 1982, now abandoned.

DETAILED DESCRIPTION OF THE INVENTION

The present invention relates to a method of hot rolling wires and plates made of metals or alloys chiefly comprising copper.

Tools made of cemented carbide, die steel, high-speed steel, etc. have been used for plastic hot deformation tools for use in rolling wires made of copper or copper alloys.

The production conditions of mass-produced articles represented by wire drawing rolls and the like have become severer year after year due to demand for higher precision and greater economical efficiency. Thus, for the plastic deformation tools too, the demand is increasing for improved resistance to heat, wear, thermal shock and the like.

In order to meet the demand, new materials are being developed one after another in the field of cemented carbide, die steel, high-speed steel, etc. However, new materials having the aforesaid characteristics have not yet been found.

The present inventors have arrived at the invention after a series of tests for the possibility of using ceramics as material of plastic hot deformation tools for steel.

That is to say, the present invention relates to a method of hot rolling copper, characterized in that tools made of silicon nitride type ceramics comprising chiefly $\beta$-type $Si_3N_4$ and having a porosity of 10% or less, Rockwell hardness of 88 or more and an average particle diameter of $2\mu$ or less are used for deformation tools.

The plastic deformation tools according to the invention have introduced a revolutionary innovation sufficient to replace the conventional conception of plastic deformation tools.

It has been discovered by the present inventors that silicon nitride excels over the conventional tools in wear resistance, particularly at high temperatures, 10 to 100 times by precisely controlling the physical properties and structure thereof, although it is one kind of ceramics and therefore has disadvantages in that it is inferior in thermal shock resistance, shock resistance and the like, and is fragile.

Thus the plastic deformation tools according to the invention exhibit excellent effect as hot rolling rolls for use at high temperatures.

According to the general conception of the conventional deformation tools used in the rolling process of copper, the useful life thereof was relatively short. Therefore, the process and equipment were designed in accordance with this general conception.

The plastic hot deformation tools according to the invention, since they have a useful life 10–100 times that of the conventional tools, make it possible to include repairs of the tools in the period repair program of the whole equipment. This enables one to completely obviate the unproductive circumstances of having to stop the whole equipment frequently for the replenishment of the tools.

As a result, not only the working ratio of the equipment is improved, but also the decrease in stocks arising in the course of deforming can be prevented, and holding of a large number of tools becomes unnecessary. Thus the plastic deformation tools according to the invention exhibit a very excellent effect.

When copper or a copper alloy is processed by a conventional plastic deformation tool, a reaction arises between said deformation tool and the workpiece consisting of copper or an alloy thereof, the repeated phenomenon of deposition and separation increasing the roughness or wear of the surface layer resulting in termination of the useful life of the tool. Particularly in hot rolling, cracks due to exfoliation phenomenon and fatigue phenomenon commonly known as spalling are produced on cemented carbide, die steel or high-speed steel as a result of repetition of depositing and separation. The spalling reduces the useful life of the plastic deformation tool.

The inventors have accomplished the invention as a result of their endeavor to eliminate the aforesaid disadvantages of the conventional plastic deformation tools.

That is to say, a method according to the present invention is characterized in that copper or copper alloys are hot rolled by the use of $Si_3N_4$ tools comprising chiefly a $\beta$-type $Si_3N_4$ phase containing $Si_3N_4$ at a ratio of 60% by weight or more and at least one kind of sintering aid selected from the group consisting of $Al_2O_3$, AlN, MgO, $Y_2O_3$ and $ZrO_2$ at a ratio of 40% by weight or less, and having a sintering density of 90% or more, Rockwell hardness of 88 or more and an average particle diameter of $2\mu$ or less.

The invention will hereinunder be described in detail in reference to the accompanying drawings.

FIG. 1(A) is an elevational view of an open-sided rolling roll, one of the plastic deformation tools for metals according to the invention.

FIG. 1(B) is a side view of the same.

FIG. 2 is a sectional view showing the state in which the open-sided rolling roll of FIG. 1 is mounted on a rolling machine.

According to the invention, it is essential that the tool is composed of material in which the deposition phenomenon is infinitesimal. In fact, ceramics has smaller depositability compared with metals.

The most popular alumina ceramics is not suitable for use in plastic deformation wherein it is subjected to high stress and heavy shocks, since said ceramics is less reliable due to its low strength.

After a series of tests of various ceramic tools, it has been found that ceramics chiefly comprising $Si_3N_4$ exhibits higher properties than the conventionally used cemented carbide and die steel as material of plastic deformation tools for use in deformation metals comprising copper and copper alloys thereof.

With regard to $Si_3N_4$ used as the chief material in the invention, there are known two production methods, i.e. the reaction sintering method in which pressed bodies of Si metal powder are nitrified, and the powder metallurgical method in which $Si_3N_4$ and additive are mixed. The former method, however, is not suitable for the invention, since it permits porosity to remain over 10%.

In case of the latter method, it is known that the use of additive largely influences the characteristics of the product.

Fundamentally, however, high strength and high shock resistance are indispensable. Therefore, the use of $Si_3N_4$ over 60 weight % is necessary.

Also, $Si_3N_4$ sintered compacts containing $Si_3N_4$ at a ratio of 60% by weight or more and at least one kind of sintering aid selected from the group consisting of $Al_2O_3$, AlN, MgO, $Y_2O_3$ and $ZrO_2$ at a ratio of 40% by weight or less exhibit a small extent of deterioration in strength, hardness and the like particularly even under the operating condition of 900° C. or more, thereby being particularly effective as hot rolling deformation tools for mill rolls for use in copper used under such a condition.

Sintered compacts having porosity below 10% are obtainable by fully pulverizing a powder mixture comprising the aforedescribed components by means of a ball mill and the like, the mixture being pressed under a pressure of 0.5-4 t/cm² and then sintered in an inactive atmosphere of $N_2$, Ar, etc., an atmosphere of ammonia, $H_2$, Co, etc., or a decompressed atmosphere, at a temperature of 1600°-1900° C.

In addition, it is necessary for sintered compacts to have Rockwell A hardness of 88 or more. Tools having Rockwell A hardness below 88 have an insufficient wear resistance, thereby the useful life thereof is remarkably shortened.

In order to maintain a sufficient hardness, it is necessary to increase the density of the sintered compacts and reduce the particle size of crystals.

It is necessary to select the particle size of $2\mu$ or less. If the particle size is more than $2\mu$, the wear resistance and strength are insufficient.

$Si_3N_4$ sintered compacts comprising chiefly $\beta$-type $Si_3N_4$ have a higher strength and exhibit stabilized performances.

In order to use $Si_3N_4$ sintered compacts as deformation tools having still more superior performances, $Si_3N_4$ preferably has a sintering density of 97% or more and Rockwell hardness of 90 or more.

In addition, it is necessary for sintered compacts to have a bending strength of 50 kg/mm² or more on an average. In sintered compacts of lower strength, cracks or breakage due to the change in load during the rolling process and the like occurs, thereby there is the possibility that they can not be stably used.

This becomes an important factor particularly in a case where they are used in the rough rolling.

With such tools, strength is decreased and reliability is reduced if there remains too much porosity. Density, therefore, is preferably as high as possible. Though porosity below 3% is suitable, porosity within 10% is tolerable in the field where the conditions of production and use of the tools are not very severe. Metals like B, Fe, Co, Ni, if used in a small amount as additive, are also effective.

FIG. 1 shows a rolling roll for use in an open-sided rolling machine as an embodiment of the plastic deformation tools according to the invention. As shown in FIG. 1, calibers 2 and key holes 3 are formed on an annular roll 1. The roll is mounted on the rolling machine as shown in FIG. 2. A tapering sleeve 5 is fitted onto a drive shaft 4 receiving a rotating force from a drive motor (not shown), the roll 1 being mounted thereon. The tapering sleeve 5 is pressed by a nut 6 and secured i place by a rock nut 7. The roll 1 is further secured with a cross key 8 fitting into the key holes 3. The cross key 8 is secured in place by a bolt 9.

Thus the roll 1 receives rotary drive force from its inner periphery through the sleeve 5, the rotation of the roll 1 being synchronized with that of a roll shaft 10 by the cross key 8. in the open-sided rolling machine consists of a drum only, the drive force being transmitted to the inner periphery of the roll by the sleeve 5 in the state in which said inner periphery is under a uniform internal pressure. Thus it has been found that the roll does not necessitate such high toughness as in the case of a metal roll, and is free from cracks and similar troubles.

The roll is small in volume and easy to produce. In addition, since the cost of material, $Si_3N_4$ being expensive, can be reduced, the open-sided system is far more economical than the close-sided system.

The invention will hereinunder be described in more detail in reference to the following examples. Though deformation tools for copper are described in the following examples, also in the case of processing of nonferrous metals, such as aluminium, zinc, tin, etc., the ceramic tools are found to be far better and to have a longer useful life than the conventional tools when the depositing characteristics of said nonferrous metals with ceramics are compared with those with Co and Fe which are chief components of cemented carbide and die steel. It may also be asserted that the ceramic tools are utilizable also in the field of plastic deformation of iron and steel as a matter of course.

EXAMPLES 1-10

The additives were blended with $Si_3N_4$ in the ratio as shown in Table 1 and the mixture was pulverized by a ball mill. The mixture thus obtained was pressed under a pressure of 1 t/cm² and sintered under 1 atmosphere pressure of nitrogen at 1800° C. for 4 hours to produce 10 kinds of rolls for the 10th step of hot rolling for finishing copper wire.

Each specific value, the rolling temperature, the rolling amount until the useful life expired and the cause of such expiration are as shown in Table 1.

TABLE I

| Example | Composition (wt %) | Particle size (μm) | Density (%) | Hardness ($H_{RA}$) | Rolling temperature (°C.) | Rolling amount (ton) | Cause of expiration of life |
|---|---|---|---|---|---|---|---|
| 1 | $95Si_3N_4$—5Mgo | 1.8 | 99 | 90 | 500 | 2300 | Wear |
| 2 | $85Si_3N_4$—$15Al_2O_3$ | 1.0 | 93 | 89 | " | 1800 | " |
| 3 | $85Si_3N_4$—$10Al_2O_3$—$5Y_2O_3$ | 1.2 | 98 | 92 | " | 2600 | " |
| 4 | $92Si_3N_4$—$2MgO$—$6Al_2O_3$ | 1.5 | 98 | 91 | " | 1900 | " |
| 5 | $92Si_3N_4$—$2MgO$—$6ZrO_2$ | 1.2 | 97 | 91 | " | 2500 | " |
| 6 | $92Si_3N_4$—$2AlN$—$6Al_2O_3$ | 1.0 | 99 | 92 | " | 2800 | " |
| 7 | $92Si_3N_4$—$2MgO$—$6Y_2O_3$ | 1.2 | 98 | 91 | " | 2200 | " |
| 8 | $98Si_3N_4$—$1MgO$—$1Al_2O_3$ | 1.0 | 98 | 93 | " | 2900 | " |
| 9* | $55Si_3N_4$—$30Al_2O_3$—15 $ZrO_2$ | 1.8 | 92 | 89 | " | 500 | " |

TABLE I-continued

| Example | Composition (wt %) | Particle size (μm) | Density (%) | Hardness ($H_{RA}$) | Rolling temperature (°C.) | Rolling amount (ton) | Cause of expiration of life |
|---|---|---|---|---|---|---|---|
| 10* | 50Si$_3$N$_4$—20Al$_2$O$_3$—30MgO | 2.6 | 89 | 86 | " | 200 | " |

(*example is not included in the present invention)

With the conventional rolling rolls produced from cemented carbide, die steel or high-speed steel, the useful life of the rolls expired when the rolling amount of copper wire reached 500–700 tons at the most. It was found that the useful life was prolonged by 2–5 times in case of the rolling rolls of the composition as shown in Table 1 according to the invention.

It was also found that rolling rolls had particularly prolonged useful life under the conditions below 900° C., while the life span was rapidly reduced when the temperature exceeded 900° C., resulting in deterioration of the wear resistance.

EXAMPLE 11

Commercial Si$_3$N$_4$ 90 weight %, Al$_2$O$_3$ 5 weight % and Y$_2$O$_3$ 5 weight % were fully mixed by a ball mill, and the mixture was subjected to a static pressure of 1 t/cm$^2$ and then sintered under 1 atmosphere pressure of nitrogen at 1800° C. for 4 hours to obtain rolls for the 10th steps of hot rolling for finishing copper wire.

It was found from the result by an X-ray diffraction method that the obtained sintered compacts are completely formed of β-type Si$_3$N$_4$ and have an average particle size of 1.0μ, hardness of 93, density of 98% and bending strength of 80 kg/mm$^2$ as measured on a cut-out sample.

The temperature of the rolling material was 500° C., the surface reduction rate being 25%, the rolling speed being 12 m/sec.

The useful life of the hot rolling rolls thus produced expired after rolling about 1550 tons due to roughness of the surface.

EXAMPLES 12–18

To commercial Si$_3$N$_4$ were added sintering additive such as Al$_2$O$_3$, Y$_2$O$_3$, etc. in the ratio as shown in Table 2 and the mixture was fully pulverized by means of a ball mill to obtain hot rolling rolls, the 10th step for finishing copper wire under the same conditions as in Examples 1–10.

By making use of the rolls, rolling materials were rolled at temperatures of 950° C., 700° C. and 500° C. respectively with the other conditions being the same as in Example 1.

As a result, it was found that the useful life of the rolls scarcely tended to decrease even at high temperatures, and even tended to increase as shown in Table 2.

TABLE 2

| Example | Composition (wt %) | Rolling temperature (°C.) | Rolling amount (ton) | Cause of expiration of life |
|---|---|---|---|---|
| 11 | 90Si$_3$N$_4$—5Al$_2$O$_3$—5Y$_2$O$_3$ | 500 | 1550 | Surface Wear |
| 12 | 80Si$_3$N$_4$—10Al$_2$O$_3$—10Y$_2$O$_3$ | 950 | 4750 | Surface Roughness |
| 13 | " | 700 | 3650 | Surface Wear |
| 14 | " | 500 | 2900 | Surface Wear |
| 15 | 80Si$_3$N$_4$—5Al$_2$O$_3$—15Y$_2$O$_3$ | 500 | 2800 | Surface Wear |
| 16 | 73Si$_3$N$_4$—15Al$_2$O$_3$—10Y$_2$O$_3$—2MgO | 950 | 4250 | Surface Roughness |
| 17 | 75Si$_3$N$_4$—15Al$_2$O$_3$—10Y$_2$O$_3$ | 700 | 3200 | Surface Wear |
| 18 | " | 500 | 2600 | Surface Wear |

EXAMPLES 19 TO 27

To commercial Si$_3$N$_4$ powders (α-type, average particle size: 0.4μ) were added sintering aids at a ratio as shown in Table 3 and the mixture was sintered in an atmosphere of nitrogen of 1 to 9 atm. at 1650° to 1900° C. for 0.5 to 5 hours to produce a roll for use in hot rolling having the characteristic values as shown in Table 3.

The obtained roll was rolled at 500° C. until the useful life thereof expired in order to see its rolling amount.

TABLE 3

| Example | Composition (wt %) | Density (%) | Particle size (μm) | Hardness ($H_{RA}$) | Bending strength (kg/mm$^2$) | Crystals | Life of roll (ton) |
|---|---|---|---|---|---|---|---|
| 19 | 85Si$_3$N$_4$—10Al$_2$O$_3$—5Y$_2$O$_3$ | 98 | 1.2 | 92 | 80 | β-Si$_3$N$_4$ | 2600 |
| 20 | " | 96 | 0.8 | 93 | 60 | " | 2400 |
| 21* | " | 89 | 0.6 | 88 | 40 | β-Si$_3$N$_4$, α-Si$_3$N$_4$ | 600 |
| 22* | " | 98 | 2.8 | 91 | 60 | β-Si$_3$N$_4$ | 1200 |
| 23* | " | 92 | 2.5 | 98 | 35 | " | 400 |
| 24* | " | 92 | 0.8 | 90 | 45 | β-Si$_3$N$_4$, α-Si$_3$N$_4$ | 800 |
| 25* | " | 91 | 0.8 | 86 | 40 | α-Si$_3$N$_4$ | 600 |
| 26 | 92Si$_3$N$_4$—2MgO—6Al$_2$O$_3$ | 98 | 1.4 | 92 | 70 | β-Si$_3$N$_4$ | 2700 |

TABLE 3-continued

| Example | Composition (wt %) | Density (%) | Particle size (μm) | Hardness ($H_{RA}$) | Bending strength (kg/mm$^2$) | Crystals | Life of roll (ton) |
|---|---|---|---|---|---|---|---|
| 27* | " | 92 | 2.5 | 90 | 65 | " | 1100 |

(*example is not included in the present invention)

As found from the results as shown in Table 3, in order to obtain a roll of long useful life, it is necessary to control the sintering density, particle size, hardness, bending strength and crystalline structure. That is to say, sintered compacts comprising chiefly β-type $Si_3N_4$ and having the sintering density of 90% or more, particle size of 2.0μ or less and hardness of 88 or more exhibit a rolling amount exceeding 2,000 tons.

Furthermore, particularly in a case where the density is 97% or more, the rolling amount comes up to 2,500 tons or more, thereby a preferable result can be attained.

As described above, the effects of the present invention can be easily recognized.

EXAMPLE 28

From a mixture of $Si_3N_4$ 80 weight %, $Al_2O_3$ 10 weight %, $Y_2O_3$ 5 weight % and MgO 5 weight % were produced guide rolls for use in aluminum wire drawing by the same method as in Example 1.

The sintering temperature was 1700° C.

A comparative test was made to compare the useful life of the guide rolls of this Example with that of the commercial cemented carbide guide rolls and that of alumina ceramic guide rolls. The results were as shown in Table 4. It is apparent that the guide rolls according to this Example are by far the best.

The speed was 15m/sec. and the temperature was 500° C.

TABLE 4

|  | Useful Life (ton) | Cause of Expiration of Life |
|---|---|---|
| Rolls of Example | 15000 | Wear |
| Ultrahard Alloy Rolls | 2000 | Surface Roughness |
| Alumina Ceramic Rolls | 2900 | Crack |

What is claimed is:

1. A method of hot rolling copper or a copper alloy, which comprises hot rolling the copper or copper alloy using a deformation tool consisting essentially of β-type $Si_3N_4$ in an amount of 60% by weight or more and at least one sintering aid selected from the group consisting of $Al_2O_3$, AlN, MgO, $Y_2O_3$ and $ZrO_2$ in an amount of 0.1 to 40% by weight, said tool having a sintering density of 90% or more, a Rockwell hardness of 88 or more and an average particle diameter of 2 microns or less.

2. A method as set forth in claim 1, wherein said tool has a sintering density of 97% or more and a Rockwell hardness of 90 or more.

* * * * *